United States Patent
Tan

(10) Patent No.: US 8,406,392 B2
(45) Date of Patent: Mar. 26, 2013

(54) METHOD AND SYSTEM FOR AUTOMATED USER AUTHENTICATION

(75) Inventor: Edwin Tan, New York, NY (US)

(73) Assignee: Sky Castle Global Limited, Tortola (VG)

( * ) Notice: Subject to any disclaimer, the term of this patent is extended or adjusted under 35 U.S.C. 154(b) by 1232 days.

(21) Appl. No.: 12/191,161

(22) Filed: Aug. 13, 2008

(65) Prior Publication Data

US 2010/0040210 A1  Feb. 18, 2010

(51) Int. Cl.
*H04M 11/00* (2006.01)
(52) U.S. Cl. .................. 379/93.02; 379/93.04
(58) Field of Classification Search ........... 379/93.02, 379/93.04, 93.03, 91.01, 91.02, 93.12, 93.22, 379/90.01; 705/14.37
See application file for complete search history.

(56) References Cited

U.S. PATENT DOCUMENTS

| | | | |
|---|---|---|---|
| 6,138,106 A | 10/2000 | Walker | |
| 6,375,073 B1 | 4/2002 | Aebi et al. | |
| 6,782,080 B2 * | 8/2004 | Leivo et al. ............. | 379/93.04 |
| 7,000,028 B1 | 2/2006 | Broadhurst et al. | |
| 7,003,500 B1 | 2/2006 | Driessen | |
| 7,295,658 B2 | 11/2007 | Moon et al. | |
| 7,337,947 B1 | 3/2008 | Swanson, Sr. | |
| 7,440,922 B1 | 10/2008 | Kempkes et al. | |
| 7,697,920 B1 * | 4/2010 | McClain ............. | 455/411 |
| 7,792,751 B2 | 9/2010 | Tan | |
| 2001/0042784 A1 | 11/2001 | Fite et al. | |
| 2002/0046341 A1 | 4/2002 | Kazaks et al. | |
| 2002/0091649 A1 | 7/2002 | Anvekar et al. | |
| 2002/0095390 A1 | 7/2002 | Hovsepian | |
| 2002/0190123 A1 | 12/2002 | Anvekar et al. | |
| 2003/0004828 A1 | 1/2003 | Epstein | |
| 2003/0033246 A1 | 2/2003 | Slater | |
| 2003/0069974 A1 | 4/2003 | Lu et al. | |
| 2003/0104174 A1 | 6/2003 | Itakura et al. | |
| 2003/0128827 A1 | 7/2003 | Khan | |
| 2003/0144935 A1 | 7/2003 | Sobek | |
| 2003/0208624 A1 | 11/2003 | Grossman | |
| 2004/0007618 A1 | 1/2004 | Oram et al. | |
| 2004/0139318 A1 | 7/2004 | Fiala et al. | |
| 2004/0181453 A1 | 9/2004 | Ray et al. | |
| 2004/0193490 A1 | 9/2004 | Pletz | |

(Continued)

FOREIGN PATENT DOCUMENTS

| | | |
|---|---|---|
| CN | 102113002 A | 6/2011 |
| CN | 102113008 A | 6/2011 |

(Continued)

OTHER PUBLICATIONS

Co-pending U.S. Appl. No. 12/134,149, filed Jun. 5, 2008.

(Continued)

*Primary Examiner* — Stella Woo
(74) *Attorney, Agent, or Firm* — Perkins Coie LLP

(57) ABSTRACT

A method and system for authenticating a telephone number. The method includes receiving a user-inputted telephone number over a communication channel. The method includes providing a security code to a user over the communication channel. The method includes initiating a voice telephone call session to the user-inputted telephone number. The method includes prompting the user over the voice telephone call session. The method includes responsive to receiving the security code from the user over the voice telephone call session, authenticating the user-inputted telephone number.

40 Claims, 6 Drawing Sheets

U.S. PATENT DOCUMENTS

| | | | |
|---|---|---|---|
| 2004/0260607 | A1 | 12/2004 | Robbins et al. |
| 2005/0157801 | A1 | 7/2005 | Gore |
| 2005/0199705 | A1 | 9/2005 | Beck et al. |
| 2006/0129501 | A1 | 6/2006 | Pastusiak et al. |
| 2006/0138215 | A1 | 6/2006 | Pallares |
| 2006/0213984 | A1 | 9/2006 | Walker |
| 2006/0233269 | A1 | 10/2006 | Bhushan et al. |
| 2006/0261154 | A1 | 11/2006 | Arthur et al. |
| 2006/0293963 | A1 | 12/2006 | Hoblit |
| 2007/0094129 | A1 | 4/2007 | Graves et al. |
| 2007/0100707 | A1 | 5/2007 | Driessen et al. |
| 2007/0110127 | A1 | 5/2007 | Mergen |
| 2007/0112655 | A1 | 5/2007 | Jones |
| 2007/0118478 | A1 | 5/2007 | Graves |
| 2007/0208869 | A1* | 9/2007 | Adelman et al. ............... 709/229 |
| 2007/0250920 | A1* | 10/2007 | Lindsay ............................ 726/7 |
| 2007/0272743 | A1 | 11/2007 | Christie et al. |
| 2007/0288326 | A1 | 12/2007 | Boldin |
| 2008/0022375 | A1 | 1/2008 | Stanley |
| 2008/0041938 | A1 | 2/2008 | Wise |
| 2008/0070548 | A1 | 3/2008 | Cha et al. |
| 2009/0192928 | A1 | 7/2009 | Abifaker |

FOREIGN PATENT DOCUMENTS

| | | |
|---|---|---|
| EP | 1531416 | 5/2005 |
| KR | 20000035847 A | 6/2000 |
| KR | 20010084957 | 9/2001 |
| KR | 20030013074 | 2/2003 |
| KR | 20030091077 A | 12/2003 |
| KR | 20040075191 A | 8/2004 |
| KR | 20080028686 | 4/2008 |
| WO | WO-0111443 A2 | 2/2001 |
| WO | WO-2009148503 A2 | 12/2009 |
| WO | WO-2009149080 A2 | 12/2009 |
| WO | WO-2010019348 A2 | 2/2010 |
| WO | WO-2011066173 A2 | 6/2011 |

OTHER PUBLICATIONS

Co-pending U.S. Appl. No. 12/628,040, filed Nov. 30, 2009.
Co-pending U.S. Appl. No. 11/903,227, filed Sep. 20, 2007.
Notice of Allowance Mailed Jan. 13, 2010 in Co-pending U.S. Appl. No. 12/134,149, filed Jun. 5, 2008.
Final Office Action Mailed Aug. 20, 2009 in Co-pending U.S. Appl. No. 12/134,149, filed Jun. 5, 2008.
Non-Final Office Action Mailed Mar. 12, 2009 in Co-pending U.S. Appl. No. 12/134,149, filed Jun. 5, 2008.
International Search Report PCT/US2009/045965 dated Jan. 14, 2010, pp. 1-3.
Written Opinion PCT/US2009/045965 dated Jan. 14, 2010; pp. 1-4.
International Search Report PCT/US2008/010044 dated Mar. 24, 2009, pp. 1-2.
International Search Report PCT/US2009/051011 dated Feb. 17, 2010, pp. 1-3.
Written Opinion PCT/US2009/051011 dated Feb. 17, 2010, pp. 1-5.
International Search Report PCT/US2009/003101 dated Dec. 30, 2009, pp. 1-3.
Mark Furletti, Prepaid Card Markets & Regulation, Feb. 2004, Federal Reserve Bank of Philadelphia, pp. 1-19.
Craigslist Rolls Out New "Phone Verification Policy"; The e Sale Guys, http://esalesguys.blogspot.com/2008/02/craigslist-rolls-out-new-phone, Sep. 30, 2009; pp. 1-3.
Co-pending U.S. Appl. No. 12/992,256 of Edwin Tan filed Dec. 15, 2010.
Co-pending U.S. Appl. No. 61/057,741 of Edwin Tan filed May 30, 2008.
Co-pending U.S. Provisional Patent Application No. of Edwin Tan U.S. Appl. No. 61/419,128 filed Dec. 2, 2010.
Co-pending U.S. Appl. No. 61/472,215 of Edwin Tan filed Apr. 6, 2011.
Final Rejection Mailed Sep. 13, 2011 in Co-pending U.S. Appl. No. 11/903,227, filed Sep. 20, 2007.
Final Rejection Mailed Nov. 7, 2011 in Co-pending U.S. Appl. No. 12/628,040, filed Nov. 30, 2009.
International Search Report PCT/US2010/057290 dated Jun. 21, 2011, pp. 1-3.
Non-Final Rejection Mailed Jan. 4, 2011 in Co-pending U.S. Appl. No. 12/628,040, filed Nov. 30, 2009.
Non-Final Rejection Mailed Mar. 21, 2011 in Co-pending U.S. Appl. No. 11/903,227, filed Sep. 20, 2007.
Notice of Allowance Mailed Jul. 26, 2010 in Co-pending U.S. Appl. No. 12/134,149, filed Jun. 5, 2008.
Restriction Requirement Mailed Aug. 23, 2011 in Co-pending U.S. Appl. No. 12/628,040, filed Nov. 30, 2009.
Restriction Requirement Mailed Feb. 2, 2011 in Co-pending U.S. Appl. No. 11/903,227, filed Sep. 20, 2007.
Restriction Requirement Mailed Nov. 9, 2010 in Co-pending U.S. Appl. No. 12/628,040, filed Nov. 30, 2009.
Written Opinion PCT/US2009/057290 dated Jun. 21, 2011; pp. 1-4.
Written Opinion PCT/US2009/003101 dated Dec. 30 2009; pp. 1-3.
Written Opinion PCT/US2008/010044 dated Mar. 24, 2009; pp. 1-2.
Extended European Search Report with Supplementary European Search Report and European Search Opinion EP 09759240.6 dated Jan. 23, 2012, pp. 1-8.
Office Action Mailed Feb. 24, 2012, in Chinese Patent Application No. 200980130784.7, pp. 1-3.
Office Action Mailed Dec. 1, 2011, in Chinese Patent Application No. 200980130786.6, pp. 1-4.
Co-pending U.S. Appl. No. 13/346,861, filed Jan. 9, 2012.
Co-pending U.S. Appl. No. 13/310,557, filed Dec. 2, 2011.
Advisory Action Mailed Apr. 3, 2012 in U.S. Appl. No. 12/628,040, filed Nov. 30, 2009.
Restriction Requirement Mailed May 14, 2012 in Co-pending U.S. Appl. No. 13/346,661, filed Jan. 9, 2012.

* cited by examiner

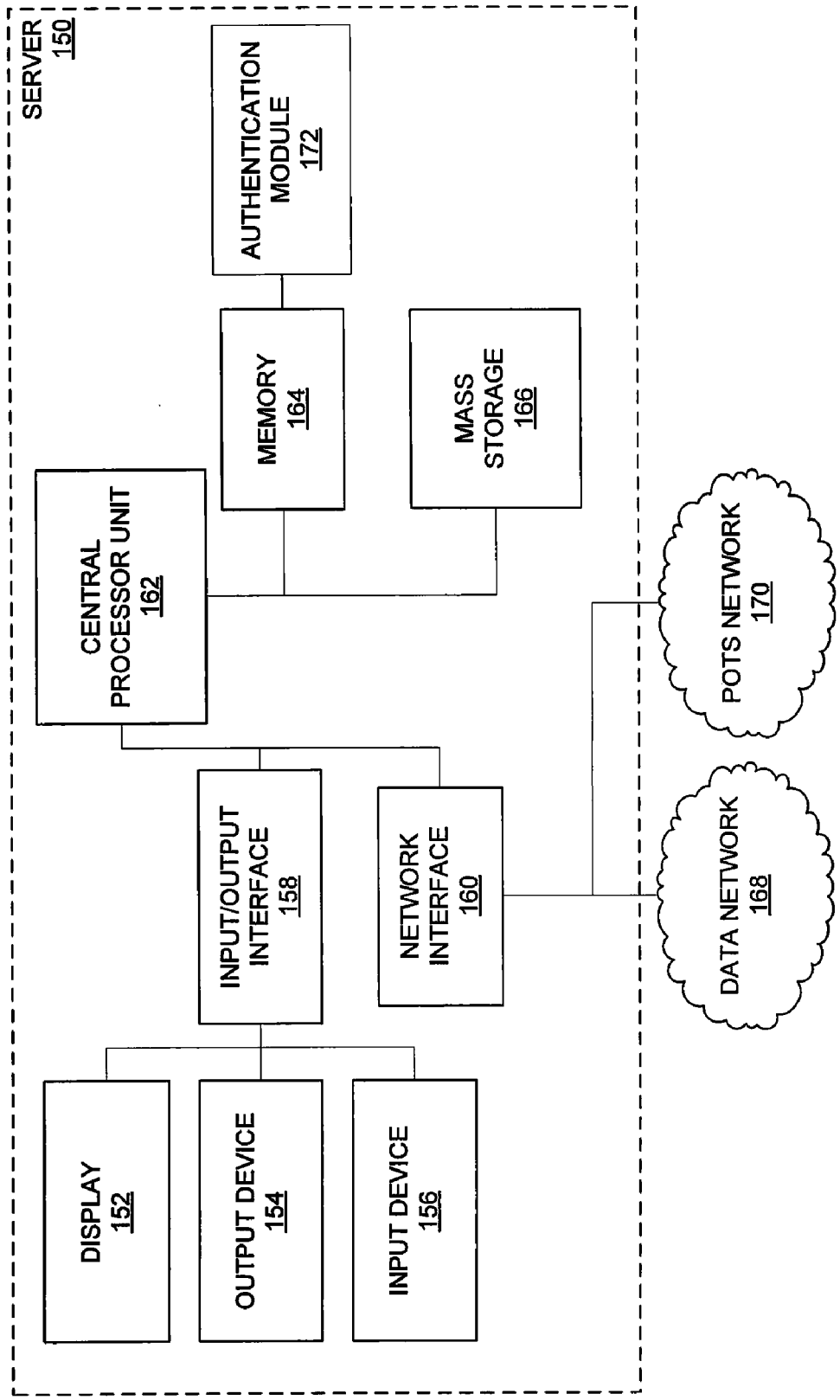

METHOD AND SYSTEM FOR AUTOMATED USER AUTHENTICATION

BACKGROUND

Various computer systems interact with users over a network. A computer system can provide services, functionality, or other features to a user. An example computer system can be a financial brokerage website, where users can enter trade orders and verify account balances. Another example computer system can be a domain name registration website, where users can register a requested domain name.

Before interacting with a computer system, a user can be required to create a user account by providing personal information, such as a username/password pair, contact information, and any other information required by the computer system.

User contact information can include telephone numbers. Such telephone numbers can be checked for formatting. For example, the computer system can flag an error if a U.S. telephone does not include a three-digit area code and a seven-digit phone number. The computer system can also check whether the three-digit area code or the seven-digit phone numbers are in a list of known valid numbers.

Alternatively, a user telephone number can be entered by a system operator, for example, after examining physical evidence of the user's ownership or access to the telephone number. For example, a brokerage website may require a broker verify a customer's telephone number before accepting.

In previous computer systems, there was no easy method of automatically verifying the telephone number as a valid number to reach the user.

Therefore, a need exists to utilize a first secure communication channel, such as the Internet to automatically authenticate a second communication channel, such as a telephone.

BRIEF DESCRIPTION OF DRAWINGS

FIG. 1B illustrates an example server for authenticating a user-provided telephone number.

DETAILED DESCRIPTION

A method and system for automatically verifying user-inputted account information. A user-inputted telephone number is received from the user over a network. The system automatically initiates a telephone call to the user-inputted telephone number. A security code is transmitted to the user over the network. The user must answer the call and reply with the security code to authenticate the user-inputted telephone number.

Figure 1A:
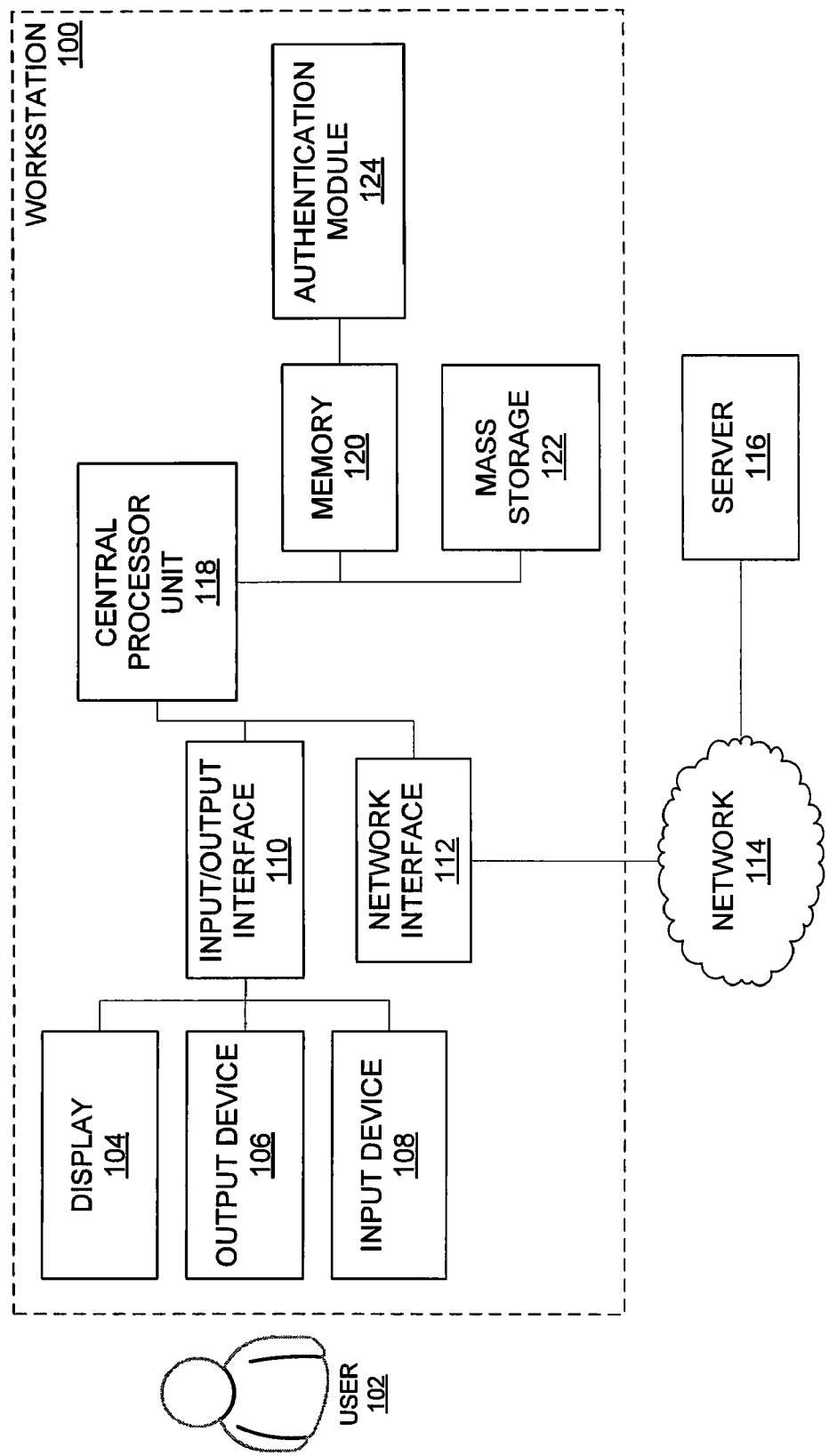
FIG. 1A illustrates an example workstation for authenticating a user-provided telephone number.

FIG. 1A illustrates an example workstation for authenticating a user-provided telephone number. The workstation 100 can execute a web browser or another software application for interfacing with a remote computer system. The workstation 100 can also provide a user interface to a user 102.

The workstation 100 can be a computing device such as a server, a personal computer, desktop, laptop, a personal digital assistant (PDA) or other computing device. The workstation 100 is accessible to the user 102 and provides a computing platform for various applications. In an example embodiment, the workstation 100 can be a standalone kiosk.

The workstation 100 can include a display 104. The display 104 can be physical equipment that displays viewable images and text generated by the workstation 100. For example, the display 104 can be a cathode ray tube or a flat panel display such as a TFT LCD. The display 104 includes a display surface, circuitry to generate a picture from electronic signals sent by the workstation 100, and an enclosure or case. The display 104 can interface with an input/output interface 110, which forwards data from the workstation 100 to the display 104.

The workstation 100 may include one or more output devices 106. The output device 106 can be hardware used to communicate outputs to the user. For example, the output device 106 can include speakers and printers, in addition to the display 104 discussed above.

The workstation 100 may include one or more input devices 108. The input device 108 can be any computer hardware used to translate inputs received from the user 102 into data usable by the workstation 100. The input device 108 can be keyboards, mouse pointer devices, microphones, scanners, video and digital cameras, etc.

The workstation 100 includes an input/output interface 110. The input/output interface 110 can include logic and physical ports used to connect and control peripheral devices, such as output devices 106 and input devices 108. For example, the input/output interface 110 can allow input and output devices 106 and 108 to be connected to the workstation 100.

The workstation 100 includes a network interface 112. The network interface 112 includes logic and physical ports used to connect to one or more networks. For example, the network interface 112 can accept a physical network connection and interface between the network and the workstation by translating communications between the two. Example networks can include Ethernet, or other physical network infrastructure. Alternatively, the network interface 112 can be configured to interface with a wireless network. Alternatively, the workstation 100 can include multiple network interfaces for interfacing with multiple networks.

The workstation 100 communicates with a network 114 via the network interface 112. The network 114 can be any network configured to carry digital information. For example, the network 114 can be an Ethernet network, the Internet, a wireless network, a cellular data network, or any Local Area Network or Wide Area Network.

Alternatively, the workstation 100 can be a client device in communications with a server over the network 114. Thus, the workstation 100 can be configured for lower performance (and thus have a lower hardware cost) and the server provides necessary processing power and resources.

The workstation 100 communicates with a server 116 via the network interface 112 and the network 114. The server 116 can be computing device as illustrated in FIG. 1B providing services to the workstation 100 over the network 114. For example, the server 116 can execute billing software for receiving time entries from the user 102. For example, the server 116 can host a document management system accessible to the workstation 100.

The workstation 100 includes a central processing unit (CPU) 118. The CPU 118 can be an integrated circuit configured for mass-production and suited for a variety of computing applications. The CPU 118 can be installed on a motherboard within the workstation 100 and control other workstation components. The CPU 118 can communicate with the other workstation components via a bus, a physical interchange, or other communication channel.

The workstation 100 includes a memory 120. The memory 120 can include volatile and non-volatile memory accessible to the CPU 118. The memory can be random access and store data required by the CPU 118 to execute installed applications. In an alternative, the CPU 118 can include on-board cache memory for faster performance.

The workstation 100 includes mass storage 122. The mass storage 122 can be volatile or non-volatile storage configured to store large amounts of data. The mass storage 122 can be accessible to the CPU 118 via a bus, a physical interchange, or other communication channel. For example, the mass storage 122 can be a hard drive, a RAID array, flash memory, CD-ROMs, DVDs, HD-DVD or Blu-Ray mediums.

The workstation 100 can include an authentication module 124. The authentication module can include a secure interface for communicating with a server, for example, an encryption/decryption module that secures network traffic. Example encryption schemes include symmetric and asymmetric key schemes.

The authentication module 124 provides a secure communication channel over the network 114 to the server 116. As part of an authentication process for a user provided phone number, the authentication module 124 can receive an encrypted security code from the server 116, decrypt the security code, and display the decrypted security code to the user 102, who then inputs the security code into a telephone.

In an alternative embodiment, the user 102 can audibly hear a security code over a telephone session. The authentication module 124 can receive the security code from the user 102 via an input device 108. The security code is encrypted by the authentication module 124 and transmitted to the server 116 via network 114 for authentication.

FIG. 1B illustrates an example server for authenticating a user-provided telephone number. A server 150 is configured to interface with a workstation, as illustrated in FIG. 1A. The server 150 can function as a computer system offering services and functionality to a user at the workstation.

The server 150 includes a display 152. The display 152 can be equipment that displays viewable images, graphics, and text generated by the server 150 to a user. For example, the display 502 can be a cathode ray tube or a flat panel display such as a TFT LCD. The display 152 includes a display surface, circuitry to generate a viewable picture from electronic signals sent by the server 150, and an enclosure or case. The display 152 can interface with an input/output interface 152, which converts data from a central processor unit 162 to a format compatible with the display 152.

The server 150 includes one or more output devices 154. The output device 154 can be any hardware used to communicate outputs to the user. For example, the output device 154 can be audio speakers and printers or other devices for providing output.

The server 150 includes one or more input devices 156. The input device 156 can be any hardware used to receive inputs from the user. The input device 156 can include keyboards, mouse pointer devices, microphones, scanners, video and digital cameras, etc.

The server 150 includes an input/output interface 158. The input/output interface 158 can include logic and physical ports used to connect and control peripheral devices, such as output devices 154 and input devices 156. For example, the input/output interface 158 can allow input and output devices 154 and 156 to communicate with the server 150.

The server 150 includes a network interface 160. The network interface 160 includes logic and physical ports used to connect to one or more networks. For example, the network interface 160 can accept a physical network connection and interface between the network and the workstation by translating communications between the two. Example networks can include Ethernet, or other physical network infrastructure. Alternatively, the network interface 160 can be configured to interface with wireless network. Alternatively, the server 160 can include multiple network interfaces for interfacing with multiple networks.

As depicted, the network interface 160 communicates over a data network 168. Alternatively, the network interface 160 can communicate over a wired network, a wireless network, or any other network configured to carry data. It will be appreciated that the server 150 can communicate over any combination of wired, wireless, or other networks.

The server 150 includes a central processing unit (CPU) 162. The CPU 162 can be an integrated circuit configured for mass-production and suited for a variety of computing applications. The CPU 162 can be installed on a motherboard within the server 150 and control other workstation components. The CPU 162 can communicate with the other workstation components via a bus, a physical interchange, or other communication channel.

The server 150 includes memory 164. The memory 164 can include volatile and non-volatile memory accessible to the CPU 162. The memory can be random access and provide fast access for graphics-related or other calculations. In an alternative, the CPU 162 can include on-board cache memory for faster performance.

The server 150 includes mass storage 166. The mass storage 166 can be volatile or non-volatile storage configured to store large amounts of data. The mass storage 166 can be accessible to the CPU 162 via a bus, a physical interchange, or other communication channel. For example, the mass storage 166 can be a hard drive, a RAID array, flash memory, CD-ROMs, DVDs, HD-DVD or Blu-Ray mediums.

The server 150 communicates with a data network 168 via the network interface 510. The data network 168 can be any network as discussed above. The server 150 can communicate with a workstation over the data network 168.

The server 150 can also communicate with a Plain Old Telephone System (POTS) network 170. The POTS network 170 can connect the server 150 to a plurality of telephones, such as fixed-line telephones and cellular telephones.

The server 150 can include an authentication module 172. The authentication module 172 can include a secure interface for communicating with a workstation, for example, an encryption/decryption module that secures network traffic. Example encryption schemes include symmetric and asymmetric key schemes.

The authentication module 172 provides a secure communication channel over the data network 168 to the workstation. As part of an authentication process for a user provided phone number, the authentication module 172 can encrypt a security code for transmission to the workstation, where the security code is decrypted and displayed to a user. The user can input the security key into a telephone, which is transmitted back to the server 150 via the POTS network 170.

In an alternative embodiment, the server 150 can audibly output the security code to the user over the POTS network 170. The user then inputs the security code into the workstation, which is then encrypted and transmitted to the server 150 for authentication.

Figure 2:
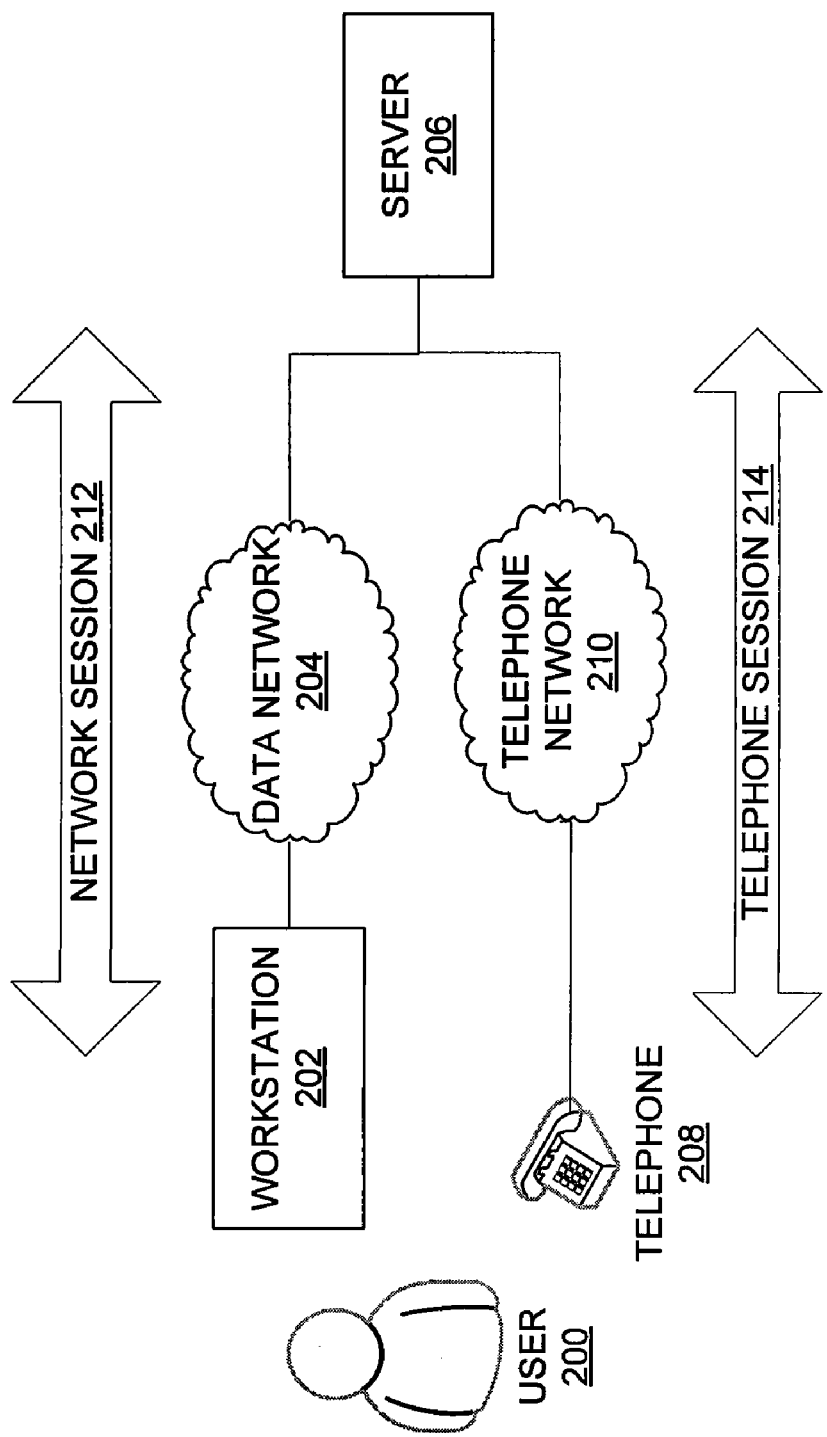
FIG. 2 illustrates an example system for authenticating a user-provided telephone number.

FIG. 2 illustrates an example system for authenticating a user-provided telephone number. A user 200 can interact with a workstation 202 and a telephone 208. The workstation 202 communicates with a server 206 over a data network 204 in a network session 212. The telephone 208 communicates with the server 206 over a telephone network 210 in a telephone session 214.

The user 200 can be an individual seeking to access services or functionality on the server 206.

The workstation 202 can be a computing device configured to provide a user interface to the user 200. For example, the workstation can be as depicted in FIG. 1A.

The data network 204 is a set of computers or computing devices connect to each other with the ability to exchange data. For example, the connections can be twisted-pair copper wire cables, coaxial cables, optical fibers, and various wireless technologies.

It will be appreciated that the data network can be wired or wireless. An example data network can be a local area network (LAN), a wide area network (WAN), or other networks. Example wireless networks include a wireless LAN, wireless WAN, cellular networks such as 3G or EDGE, or other wireless networks.

The data network 204 can facilitate communications between the workstation 202 and the server 206. It will be appreciated that a communications channel can be a communications path from a sender to a recipient via a network.

The server 206 can be a computing device configured as a computer system to interact with the user 200 and provide requested services or functionality. For example, the server 206 can be as illustrated in FIG. 1B.

The telephone 208 can be a telecommunications device used to transmit and receive speech between two or more parties. It will be appreciated the telephone 208 can support alternative communication protocols that utilize sounds to represent data, such as modems and TTY devices.

The telephone network 210 can be configured to carry speech data between two or more parties. Example telephone networks include a traditional landline telephone system, also known as a plain old telephone service (POTS), Public Switched Telephone Network (PSTN), and Voice over IP (VoIP) networks. Another example telephone network includes cellular phone networks.

The network session 212 can be a semi-permanent interactive information exchange between the workstation 202 and the server 206 over the data network 204. The network session 212 is established responsive to a user or server command and subsequently torn down responsive to an end in communications. The network session 212 can include one or more messages transmitted in each direction. A session can be stateful, where at least one of the workstation 202 or the server 206 must save information about the session history in order to be able to communicate. The network session 212 can be configured to transmit digital computer information.

The telephone session 214 can be similar to the network session 212, but configured to transmit voice telephone calls over the telephone network 210.

In operation, the user 200 inputs a user-inputted telephone number at the workstation 202, which is transmitted to the server 206. The user 200 then receives a security code from the server 206 over at either the workstation 202 or the telephone 208. The user 200 then transmits the security code to the server 200 from the workstation 202 or the telephone 208, where the security code was not received. This allows the server 206 to authenticate the user 200's access to the user-inputted telephone number.

Figure 3A:
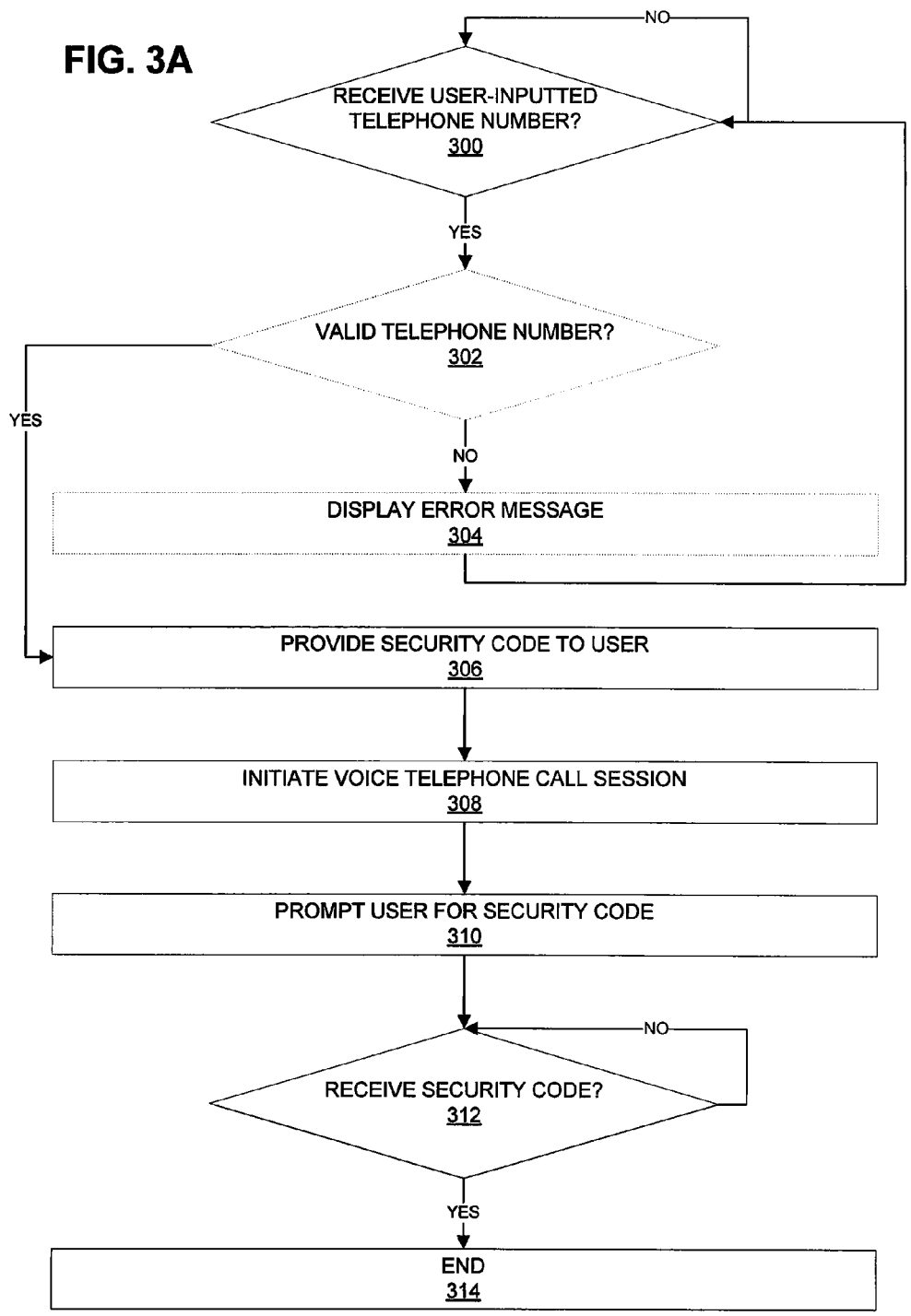
FIG. 3A illustrates a first example procedure for authenticating a user-provided telephone number.

FIG. 3A illustrates a first example procedure for authenticating a user-provided telephone number. The authentication procedure can include securely transmitting a security code to a user over a data network and receiving the security code over a voice telephone call session to a user-inputted telephone number. The procedure can execute on a system as illustrated in FIG. 2 between a user accessing a workstation and a server.

In 300, the server can test whether a user-inputted telephone number has been received. The user-inputted telephone number can be inputted by the user at the workstation and transmitted to the server over a data network during a network session. For example, the workstation can execute an Internet browser providing a user interface to the user and communicate with a server application on the server providing a requested service or functionality. The user can input the user-inputted telephone number into the workstation on an input device.

For example, the user-inputted telephone number can be encrypted by the workstation before transmission or otherwise secured. Similarly, the server can decrypted the received encrypted user-inputted telephone number before proceeding.

If the user-inputted telephone number has been received, the server can proceed to 302. If no user-inputted telephone number has been received, the server can remain in 300.

In 302, the server can optionally test whether the user-inputted telephone number is a valid telephone number. The server can parse the user-inputted telephone number into an area code and a telephone number. For example, the server can test whether the user-inputted telephone number has a correct number of digits, a valid area code, a valid telephone number, etc. Valid area codes can be stored in a data structure optimized for rapid comparisons. Similarly, valid telephone numbers can be stored in a data structure for comparison against the parsed telephone number.

In one alternative embodiment, no valid numbers are stored, but the user-inputted telephone number is processed through a set of rules. For example, no valid telephone number begins with "555" and no area codes begin with "1".

It will be appreciated that other error checking mechanisms can be utilized.

If the user-inputted telephone number is valid, the server can proceed to 306. If the user-inputted telephone number is not valid, the server can proceed to 304.

In 304, the server can optionally transmit an error message to be displayed to the user at the workstation. Responsive to an invalid telephone number received from the user, the server can transmit an error message to the workstation for display to the user. The workstation can prompt the user to re-enter the user-inputted telephone number.

In one embodiment, 302 and 304 can be executed on the workstation, and the user-inputted telephone number is transmitted from the workstation to the server after it is determined to be valid.

In 306, the server can transmit a security code to the workstation for display to the user. The security code can be a random sequence of alphanumeric characters.

In one example, the security code can be selected for ease of verbal pronunciation by the user.

In another example, the security code can be purely numeric characters for easy input on a telephone dial pad.

In another example, the security code can be numeric characters representing a character string. Each numeric character is associated with a plurality of alphabetic characters, and words correspond to numeric character strings.

The security code can be encrypted or otherwise secured before transmission to the workstation.

The security code can be scrambled when displayed or otherwise secured. For example, CAPTCHA challenge-response tests can be used to ensure a user response is not generated by a computer.

In 308, the server can initiate a voice telephone call session over a telephone network to the user-inputted telephone number. The server can be in communications with the telephone network and initiate the telephone session by dialing the user-inputted telephone number into an active telephone line. It will be appreciated that different procedures can be used for different telephone networks.

It will be appreciated that 306 and 308 can be performed sequentially in any order, or simultaneously.

In 310, the server can prompt the user for the security code. For example, the server can transmit a request to the workstation to prompt the user to answer the incoming telephone call and input the security code into the telephone for authentication. The security code can be parsed from the telephone call with a voice recognition system or software.

In one example, the user's voice input into the telephone can be recorded in an accessible memory for audit or security purposes. The recorded voice input can be reviewed by computer software or a live operator.

In 312, the server can test whether the security code was received from the user. After the server detects the telephone session is opened (for example, by the user answering the telephone), the server waits for user input over the telephone session. The server can test whether a received user input is the security code.

The user can input the security code by speaking into the telephone or by tapping on a telephone dial pad.

If the security code was received, the server can proceed to 314. If the security code was not received, the server can remain in 312.

In 314, the server can exit the procedure.

Figure 3B:
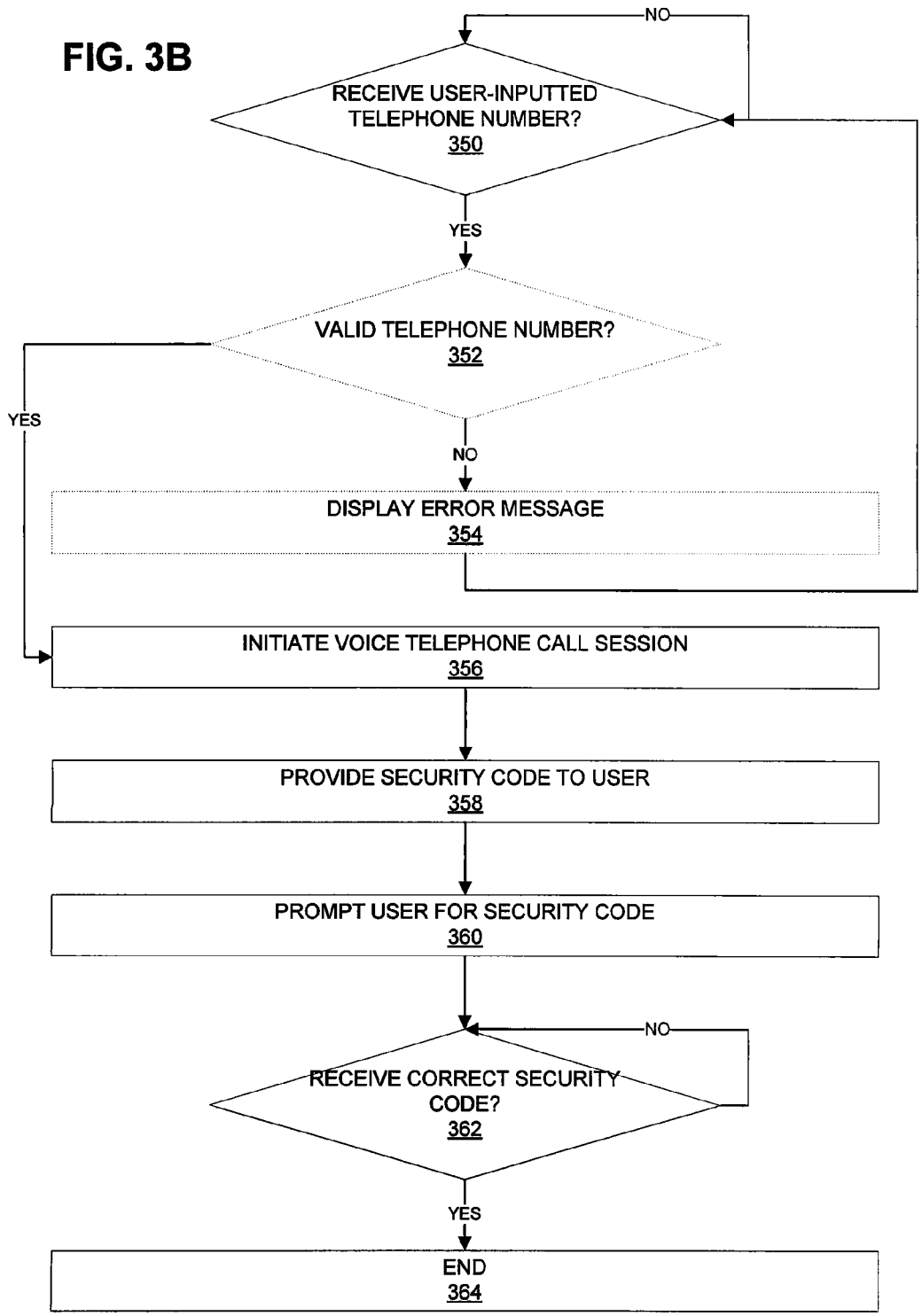
FIG. 3B illustrates a second example procedure for authenticating a user-provided telephone number.

FIG. 3B illustrates a second example procedure for authenticating a user-provided telephone number. The authentication procedure can include audibly transmitting a security code to a user over a voice telephone call session to a user-inputted telephone number, and receiving the security code from the user over a data network. The procedure can execute on a system as illustrated in FIG. 2 between a user accessing a workstation and a server. The procedure can be similar to the first example procedure illustrated in FIG. 3A

In 350, the server can test whether a user-inputted telephone number has been received. The user-inputted telephone number can be inputted by the user at the workstation and transmitted to the server over a data network during a network session. For example, the workstation can execute an Internet browser providing a user interface to the user and communicate with a server application on the server providing a requested service or functionality. The user can input the user-inputted telephone number into the workstation on an input device.

For example, the user-inputted telephone number can be encrypted by the workstation before transmission or otherwise secured. Similarly, the server can decrypted the received encrypted user-inputted telephone number before proceeding.

If the user-inputted telephone number has been received, the server can proceed to 352. If no user-inputted telephone number has been received, the server can remain in 350.

In 352, the server can optionally test whether the user-inputted telephone number is a valid telephone number. The server can parse the user-inputted telephone number into an area code and a telephone number. For example, the server can test whether the user-inputted telephone number has a correct number of digits, a valid area code, a valid telephone number, etc. Valid area codes can be stored in a data structure optimized for rapid comparisons. Similarly, valid telephone numbers can be stored in a data structure for comparison against the parsed telephone number.

In one alternative embodiment, no valid numbers are stored, but the user-inputted telephone number is processed through a set of rules. For example, no valid telephone number begins with "555" and no area codes begin with "1".

It will be appreciated that other error checking mechanisms can be utilized.

If the user-inputted telephone number is valid, the server can proceed to 356. If the user-inputted telephone number is not valid, the server can proceed to 354.

In 354, the server can optionally transmit an error message to be displayed to the user at the workstation. Responsive to an invalid telephone number received from the user, the server can transmit an error message to the workstation for display to the user. The workstation can prompt the user to re-enter the user-inputted telephone number.

In one embodiment, 352 and 354 can be executed on the workstation, and the user-inputted telephone number is transmitted from the workstation to the server after it is determined to be valid.

In 356, the server can initiate a voice telephone call session over a telephone network to the user-inputted telephone number. The server can be in communications with the telephone network and initiate the telephone session by dialing the user-inputted telephone number into an active telephone line. It will be appreciated that different procedures can be used for different telephone networks.

In 358, the server can transmit a security code to the telephone for audible output to the user. The security code can be a random sequence of alphanumeric characters.

In one example, the security code can be selected for ease of audible comprehension by the user.

In 360, the server can prompt the user for the security code. For example, the server can transmit a request to the workstation to prompt the user to answer the incoming telephone call and input the security code into the workstation for authentication.

In 362, the server can test whether the security code was received from the user. After the server detects the telephone session is opened (for example, by the user answering the telephone), the server waits for user input over the network session. The server can test whether a received user input is the security code.

If the security code was received, the server can proceed to 364. If the security code was not received, the server can remain in 362.

In 364, the server can exit the procedure.

In one example, the above procedures can be executed upon registration or another user-initiated process requiring user information. In another example, the above procedures can be executed a predetermined amount of time after the user-initiated process. For example, the user can register a new account at a kiosk and desire to enter a home phone number or another phone number not immediately accessible. The procedures can execute at a later time to call and authenticate the user-inputted phone number.

In one example, the computer system can provide a limited service pending authenticating the user-inputted phone number. In this example, the computer system can suspend or terminate service if the user-inputted phone number is not authenticated within a predetermined amount of time.

Figure 4A:
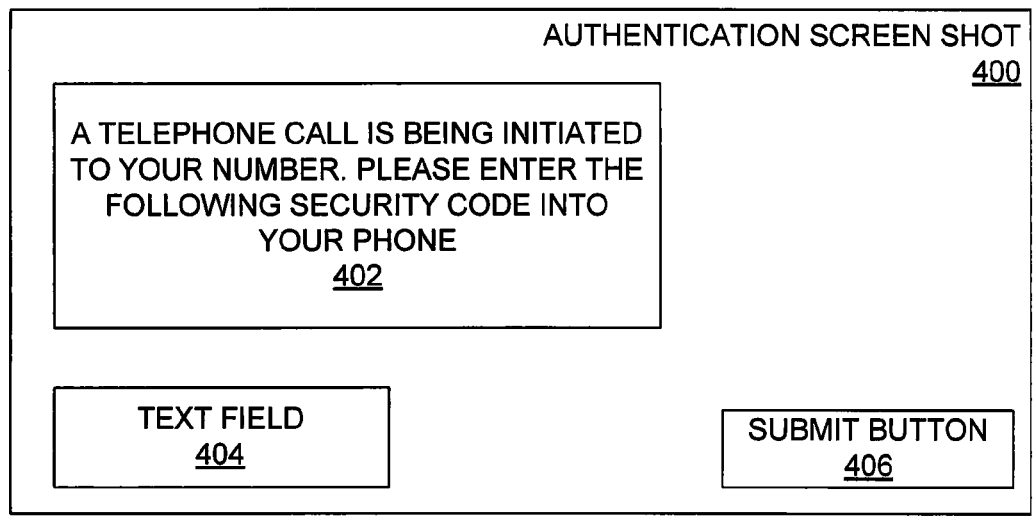
FIG. 4A illustrates a first example screen shot displayed to a user for authenticating a user-provided telephone number.

FIG. 4A illustrates a first example screen shot 400 displayed to a user for authenticating a user-provided telephone number. The screenshot can be displayed on a workstation as illustrated in FIG. 1A in a system executing the procedure illustrated in FIG. 3A.

The screen shot 400 can include instructions 402. The instructions 402 can instruct the user to answer an incoming telephone call initiated by a server to the user-inputted telephone number. The instructions 402 can instruct the user to input a displayed security code into a telephone after a telephone session has been established. The instructions 402 can instruct the user to press a submit button after the security code has been inputted.

The screen shot 400 can include a text field 404. The text field 404 can display the security code, as discussed above.

The screen shot 400 can include a submit button 406. Responsive to the user pressing the submit button 406, the workstation can transmit an indication to the server that the security code has been inputted into the telephone.

Figure 4B:
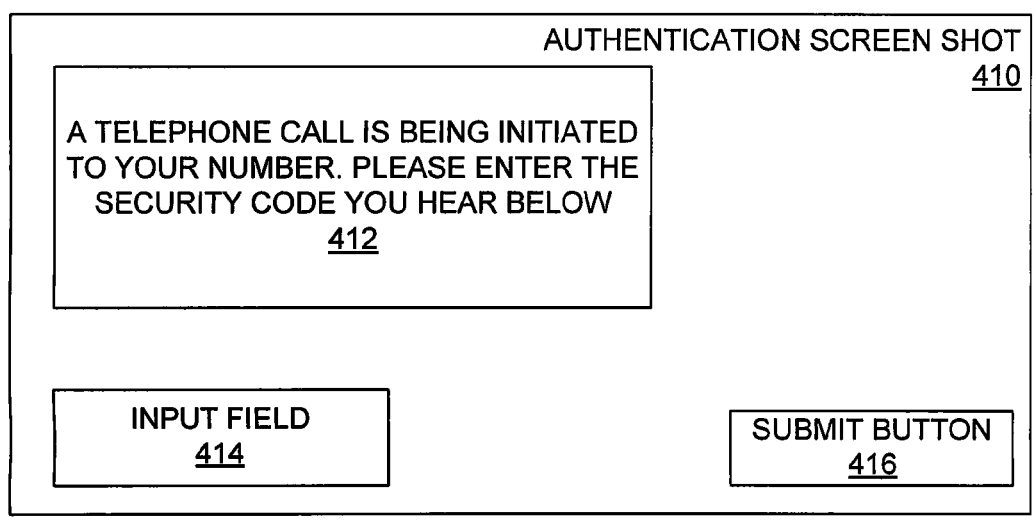
FIG. 4B illustrates a second example screen shot displayed to a user for authenticating a user-provided telephone number.

FIG. 4B illustrates a second example screen shot 410 displayed to a user for authenticating a user-provided telephone number. The screenshot can be displayed on a workstation as illustrated in FIG. 1A in a system executing the procedure illustrated in FIG. 3B.

The screen shot 410 can include instructions 412. The instructions 412 can instruct the user to answer an incoming telephone call initiated by a server to the user-inputted telephone number. The instructions 402 can instruct the user to answer the telephone, listen for a security code, and input the security code into an input field. The instructions 412 can instruct the user to press a submit button after the security code has been inputted.

The screen shot 410 can include an input field 414. The input field 414 can receive a security code inputted by the user, as discussed above.

The screen shot 410 can include a submit button 416. Responsive to the user pressing the submit button 416, the workstation can transmit the security code inputted by the user to the server for authentication.

It will be appreciated that alternative communications can be used besides a data network and a telephone network. For example, verification can occur via short message service (SMS) messages sent to a cellular telephone, or email messages sent to a user's email account.

The above systems and procedures can be useful in initial and periodic verification of user information on a computer system. For example, a domain name registrar can require a valid telephone number as part of a user account information associated with a domain name.

As discussed above, one example embodiment of the present invention can be a method for authenticating a telephone number. The method can include receiving a user-inputted telephone number over a communication channel. The method can include providing a security code to a user over the communication channel. The method can include initiating a voice telephone call session to the user-inputted telephone number. The method can include prompting the user over the voice telephone call session for the security code. The method can include, responsive to receiving the security code from the user over the voice telephone call session, authenticating the user-inputted telephone number. The communication channel can be over at least one of: a data network, a voice network, and a cellular network. The security code can be encrypted before being provided to the user over the communication channel. The security code can be a sequence of alphanumeric characters. The security code can be received from the user over the voice telephone call session by at least one of: the user speaking the security code into the channel or the user pressing telephone keys. The user-inputted telephone number can be authenticated as part of at least one of: a periodic verification of a user account and a creation of a user account. The user account can be a domain name registration.

Another example embodiment of the present invention can be a method for authenticating a telephone number. The method can include receiving a user-inputted telephone number over a communication channel. The method can include initiating a voice telephone call session to the user-inputted telephone number. The method can include providing a security code to a user over the voice telephone call session. The method can include prompting the user over the communication channel for the security code. The method can include, responsive to receiving the security code from the user over the communication channel, authenticating the user-inputted telephone number. The communication channel can be over at least one of: a data network, a voice network, and a cellular network. The security code can be decrypted after being received from the user over the communication channel. The security code can be sequence of alphanumeric characters. The security code can be provided to the user over the voice telephone call session audibly. The user-inputted telephone number can be authenticated as part of at least one of: a periodic verification of a user account and a creation of a user account. The user account can be a domain name registration.

Another example embodiment of the present invention can be a system for accepting delayed payment of prepaid cards. The system can include a server, the server in communications with a workstation over a data network and a telephone over a telephone network. The server can be configured to receive a user-inputted telephone number. The server can be configured to initiate a voice telephone call session over the telephone network to a telephone associated with the user-inputted telephone number. The server can be configured to audibly output a security code to a user at the telephone. The server can be configured to prompt the user at the workstation to enter the security code. The server can be configured to, responsive to receiving the security code from the user, authenticating the user-inputted telephone number. The security code can be encrypted by the workstation before transmission to the server. The security code can be a sequence of numeric digits. The user-inputted telephone number can be authenticated as part of at least one of: a periodic verification of a user account and a creation of a user account. The user-inputted telephone number can be received from the workstation over the data network. The data can be transferred over a network session on the data network.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method for authenticating a telephone number, comprising:
   receiving, at a server, a user-inputted telephone number over a communication channel;
   providing, from the server, a security code to a user over the communication channel;
   in response to a user request, delaying, at the server, an initiation of a voice telephone call session to the user-inputted telephone number for a predetermined period of time;
   initiating, at the server, the voice telephone call session to the user-inputted telephone number;
   prompting, from the server, the user over the voice telephone call session for the security code; and
   responsive to receiving the security code, at the server, from the user over the voice telephone call session, authenticating the user-inputted telephone number.

2. The method of claim 1, wherein the user-inputted telephone number is a home phone number, wherein the user-inputted telephone number is provided from a kiosk, further wherein a telephone associated with the home phone number is physically inaccessible from the kiosk.

3. The method of claim 1, wherein the communication channel is over at least one of: a data network, a voice network, and a cellular network, wherein the security code is encrypted before being provided to the user over the communication channel.

4. The method of claim 1, wherein the security code is at least one of: a sequence of alphanumeric characters, a sequence of numeric characters, and a sequence of user-spoken words.

5. The method of claim 4, wherein the security code is received from the user over the voice telephone call session by at least one of: the user speaking the security code into the channel or the user pressing telephone keys.

6. The method of claim 1, wherein the user-inputted telephone number is authenticated as part of at least one of: a periodic verification of a user account and a creation of a user account.

7. The method of claim 6, wherein the user account is a domain name registration.

8. The method of claim 1, wherein the security code is provided to the user as a CAPTCHA image.

9. A system for accepting delayed payment of prepaid cards, comprising:
   a server, the server in communications with a workstation over a data network and a telephone over a telephone network, wherein the server is configured to
   receive a user-inputted telephone number,
   in response to a user request, delaying an initiation of a voice telephone call session over the telephone network to a telephone associated with the user-inputted telephone number for a predetermined period of time;
   initiate the voice telephone call session over the telephone network to the telephone associated with the user-inputted telephone number,
   provide a security code to a user via the workstation over the data network,
   prompt the user at the workstation to enter the security code over the voice telephone call session, and
   responsive to receiving the security code from the user over the voice telephone call session, authenticating the user-inputted telephone number.

10. The system of claim 9, wherein the user-inputted telephone number is a home phone number, wherein the user-inputted telephone number is provided from a kiosk, further wherein a telephone associated with the home phone number is physically inaccessible from the kiosk.

11. The system of claim 9, wherein the security code is encrypted by the workstation before transmission to the server, wherein the security code is at least one of: a sequence of numeric digits, a sequence of numeric characters, and a sequence of user-spoken words.

12. The system of claim 9, wherein the user-inputted telephone number is authenticated as part of at least one of: a periodic verification of a user account and a creation of a user account.

13. The system of claim 9, wherein the user-inputted telephone number is received from the workstation over the data network.

14. The system of claim 9, wherein data is transferred over a network session on the data network.

15. The system of claim 9, wherein the security code is provided to the user as a CAPTCHA image.

16. A system for accepting delayed payment of prepaid cards, comprising:
   a server, the server in communications with a workstation over a data network and a telephone over a telephone network, wherein the server is configured to
   receive a user-inputted telephone number,
   in response to a user request, delay an initiation of a voice telephone call session to a telephone associated with the user-inputted telephone number for a predetermined period of time;
   initiate the voice telephone call session over the telephone network to the telephone associated with the user-inputted telephone number,
   provide a security code to a user via the workstation over the data network, wherein the security code is encrypted for transmission over the data network,
   prompt the user to enter the security code over the voice telephone call session, wherein the security code is encrypted for transmission over the voice telephone call session, and
   responsive to receiving the security code from the user over the voice telephone call session, authenticating the user-inputted telephone number.

17. The system of claim 16, wherein the security code is at least one of: a sequence of alphanumeric characters, a sequence of numeric characters, and a sequence of user-spoken words.

18. The system of claim 16, wherein the security code is a sequence of numeric characters entered by the user via a receiving telephone keypad.

19. The system of claim 16, wherein the security code is a sequence of user-spoken words spoken by the user into a telephone microphone.

20. The system of claim 19, wherein the server is further configured to execute a voice recognition module for recognizing the user-spoken security code received over the voice telephone call session.

21. The system of claim 19, wherein the server is further configured to store a sample of the user-spoken security code in an accessible storage.

22. The system of claim 16, wherein the voice telephone call session is initiated after a predetermined delay after receiving the user-inputted telephone number.

23. The system of claim 16, wherein the security code is provided to the user as a CAPTCHA image.

24. The system of claim 16, wherein the user-inputted telephone number is a home phone number, wherein the user-inputted telephone number is provided from a kiosk, further wherein a telephone associated with the home phone number is physically inaccessible from the kiosk.

25. A computer-implemented method for periodic authentication of a user account, the method comprising:
receiving a telephone number;
associating the received telephone number with the user account, the user account being associated with a user;
providing a security code to the user, the security code being associated with the user account;
initiating a voice telephone call session to the received telephone number;
prompting the user over the voice telephone call session for the security code;
responsive to receiving the security code from the user over the voice telephone call session, authenticating the user account associated with the telephone number and the security code; and
re-authenticating the user account after a first lapse of a first predetermined period of time.

26. The method of claim 25, wherein the authentication of a particular user account is required to render a service to a particular user, the particular user being associated with the authenticated particular user account.

27. The method of claim 26, further comprising:
when the user account is awaiting authentication, rendering a limited service to the user;
sending a message to the user to authenticate the user account;
when the user account is un-authenticated for a second predetermined period of time, suspending rendering of the service to the user; and
when the user account is un-authenticated for a third predetermined period of time, terminating rendering of the service to the user.

28. The method of claim 27, wherein the authentication of a particular user account before the lapse of the third predetermined period of time will restore rendering of the service to the particular user.

29. The method of claim 25, wherein the user account is a domain name registration.

30. The method of claim 25, wherein the security code is encrypted before being provided to the user over a communication channel.

31. The method of claim 30, wherein the security code is at least one of: a sequence of alphanumeric characters, a sequence of numeric characters, and a sequence of user-spoken words.

32. The method of claim 30, wherein the security code is received from the user over the voice telephone call session by at least one of: the user speaking the security code into the channel or the user pressing telephone keys.

33. A system for periodic authentication of a user account, the system comprising:
a server, the server in communications with a workstation over a data network and a telephone over a telephone network, wherein the server is configured to
receive a telephone number,
associate the received telephone number with the user account, wherein the user account is associated with a user,
provide a security code to the user, the security code being associated with the user account,
initiate a voice telephone call session to the received telephone number,
prompt the user over the voice telephone call session for the security code,
responsive to receiving the security code from the user over the voice telephone call session, authenticate the user account associated with the telephone number and the security code, and
re-authenticate the user account after a first lapse of a first predetermined period of time.

34. The system of claim 33, wherein the authentication of a particular user account is required to render a service to a particular user, the particular user being associated with the authenticated particular user account.

35. The system of claim 34, further comprising:
when the user account is awaiting authentication, render a limited service to the user,
send a message to the user to authenticate the user account,
when the user account is un-authenticated for a second predetermined period of time, suspend rendering of the service to the user, and
when the user account is un-authenticated for a third predetermined period of time, terminate rendering of the service to the user.

36. The method of claim 35, wherein the authentication of a particular user account before the lapse of the third predetermined period of time will restore rendering of the service to the particular user.

37. The method of claim 33, wherein the user account is a domain name registration.

38. The method of claim 33, wherein the security code is encrypted before being provided to the user over a communication channel.

39. The method of claim 33, wherein the security code is at least one of: a sequence of alphanumeric characters, a sequence of numeric characters, and a sequence of user-spoken words.

40. The method of claim 39, wherein the security code is received from the user over the voice telephone call session by at least one of: the user speaking the security code into the channel or the user pressing telephone keys.

* * * * *